(12) United States Patent
Otani et al.

(10) Patent No.: US 9,598,561 B2
(45) Date of Patent: Mar. 21, 2017

(54) SILVER POWDER FOR SILVER CLAY AND SILVER CLAY INCLUDING SAME SILVER POWDER

(71) Applicant: MITSUBISHI MATERIALS CORPORATION, Tokyo (JP)

(72) Inventors: Shinji Otani, Sanda (JP); Yoshifumi Yamamoto, Sanda (JP); Takashi Yamaji, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 646 days.

(21) Appl. No.: 13/731,747

(22) Filed: Dec. 31, 2012

(65) Prior Publication Data

US 2013/0213261 A1 Aug. 22, 2013

(30) Foreign Application Priority Data

Jan. 10, 2012 (JP) .................................. 2012-002339

(51) Int. Cl.
*C08L 1/28* (2006.01)
*B22F 1/00* (2006.01)
*B22F 9/08* (2006.01)

(52) U.S. Cl.
CPC .............. *C08L 1/28* (2013.01); *B22F 1/0003* (2013.01); *B22F 1/0074* (2013.01); *B22F 9/082* (2013.01); *B22F 2009/0828* (2013.01); *B22F 2301/255* (2013.01)

(58) Field of Classification Search
CPC ............ C22C 5/06; C22C 47/00; C22C 47/14
USPC ................................................ 419/21; 75/252
See application file for complete search history.

(56) References Cited

U.S. PATENT DOCUMENTS

| 5,328,775 | A | * | 7/1994 | Hoshino | ............... | A44C 27/003 428/560 |
| 5,990,358 | A | * | 11/1999 | Knuth | ...................... | B01J 23/50 568/471 |
| 2005/0115466 | A1 | * | 6/2005 | Hirasawa | ............. | A44C 27/002 106/640 |

FOREIGN PATENT DOCUMENTS

| JP | 2000-327462 A | 11/2000 |
| JP | 2002-241802 A | 8/2002 |
| JP | 3687419 B | 8/2005 |

OTHER PUBLICATIONS

Notice of Reasons for Rejection, issued in corresponding Japanese Patent Application No. JP 2012-002339, dated Aug. 20, 2015.

* cited by examiner

*Primary Examiner* — Jessee Roe
*Assistant Examiner* — Jeremy Jones
(74) *Attorney, Agent, or Firm* — Locke Lord LLP; James E. Armstrong, IV; Nicholas J. DiCeglie, Jr.

(57) ABSTRACT

A silver powder for silver clay, wherein a main component is Ag, and an amount of P is controlled to be 100 ppm or less.

5 Claims, 3 Drawing Sheets

SILVER POWDER FOR SILVER CLAY AND SILVER CLAY INCLUDING SAME SILVER POWDER

BACKGROUND OF THE INVENTION

Field of the Invention

The present invention relates to a silver powder for silver clay having excellent sinterability and silver clay including the same silver powder.

Priority is claimed on Japanese Patent Application No. 2012-002339 filed on Jan. 10, 2012, the content of which is incorporated herein by reference.

Background Art

Jewelry and artistic craft objects made of silver may be manufactured by casting or forging a silver ingot. On the other hand, in recent years, silver jewelry or silver artistic craft objects are also manufactured by a method using a commercially available silver clay including a silver powder. In this method, jewelry or artistic craft objects having a desired shape are manufactured by shaping the silver clay to have the desired shape, and subsequently firing the shaped silver clay. In this method, the silver clay may be shaped to have an arbitrary shape in the similar manner as the general clay craft objects. After drying the shaped body, the shaped body is carried to the place of the firing furnace, and is fired in the furnace. By this simple method, it is possible to manufacture jewelry or artistic craft objects made of silver very easily.

Development of silver powder for silver clay having excellent sinterability has been reported in Japanese Patent No. 3687419. This silver powder has a composition containing one or two or more selected from the group consisting of Sn, Pb, Cu, Bi, and Fe in total amount of 20 to 900 ppm, and the balance consisting of Ag and unavoidable impurities.

Japanese Patent No. 3687419 has proposed production of silver clay containing 50 to 95% by weight of silver powder, 0.8 to 8% by weight of binder, 0.1 to 3% by weight of fat, 0.03 to 3% by weight of surface active agent, and a balance of water using the above-described silver clay. It is possible to achieve silver jewelry or a silver artistic craft object having a desired shape by forming this silver clay into a desired shape, drying and subsequently firing the silver clay.

As described above, a silver clay may be generally freely shaped in similar manner as a soil-clay craft object. Silver jewelry or a silver artistic craft object may be produced by drying and subsequently firing the thus achieved shaped body. There are large varieties of shapes in silver jewelry or the silver artistic craft objects, and the silver clay is shaped in accordance with the desired shape.

Silver jewelry or artistic craft objects have various shapes including a shape totally constituted of a flat or curved plate or a shape partially comprising a flat or a curved plate. The silver clay is shaped in accordance with these various shapes, dried, and subsequently fired.

For example, in some cases, jewelry is made by forming plate-shaped or a film-shaped sintered body on a substrate made of, for example, ceramics. For example, Japanese Unexamined Patent Application First Publication No. 2000-327462 describes a composition for sintering a noble metal formed by adding a binder to an inorganic powder composed of a powder of noble metal such as silver, sintering enhancing agent, and bonding enhancing agent composed of a metal compound powder or glass powder, and keening the inorganic powder added with the binder to form a clay or a slurry. Japanese Unexamined Patent Application First Publication No. 2000-327462 describes that a noble metal film with high adhesion to the ceramic shaped body can be formed by using the composition.

When the above-described shaped body of a silver clay formed into a plate shape is fired, the obtained shaped body achieves a flat surface corresponding to the desired shape. However, where the plate-shaped portion of the sintered body is thin, defective sintering such as numerous occurrence of scabs on the flat surface may occur as shown in FIG. 2. Where a large number of scabs are formed, the scabs may disturb decoration (ornament) of the silver jewelry or artistic craft object, and deteriorate the desired appearance of decoration, or may result in formation of decoration apart from the desired design.

An object of the present invention is to provide a silver clay that is capable of suppressing occurrence of scabs in a fired body formed by drying and firing a shaped body, and to provide a silver powder that can be used in such a silver clay.

SUMMARY OF THE INVENTION

A silver powder for silver clay according to the present invention is a silver powder in which the main component is silver and an amount of P is controlled (limited) to be 100 ppm or less.

Preferably, the above-described silver powder is an atomized powder obtained by atomizing molten silver using clean water in which P content is controlled to very small value. Therefore, the above described silver powder may be an atomized silver powder formed by atomizing molten silver using water containing 18 ppm or less of P.

To provide excellent sinterability to a silver clay according to the present invention, the silver clay may be a silver clay formed by adding binder to the above-described silver powder, a silver clay formed by adding binder and surface active agent to the silver clay, or a silver clay formed by binder, fat, and surface active agent.

Therefore, a silver clay according to the present invention may be a silver clay having excellent sinterability that contains a silver powder in which the main component is silver and the amount of P component is controlled to be 100 ppm or less, binder, and a balance of water.

The silver powder used in the above-described silver clay may be an atomized silver powder obtained by atomizing molten silver by water containing 18 ppm or less of P.

The above-described silver powder may further contain surface active agent and/or fat. Such a silver clay has excellent sinterability.

When a shaped body (shaped object) is formed using the above-described silver clay according to the present invention, and a fired body (fired object) is formed by drying and subsequently firing the shaped body, it is possible to suppress occurrence of scabs on the surface of the fired body even where the shaped body has a thin plate shape. Therefore, a person having no specific skill in jewelry working may fabricate a pure silver artistic craft object and jewelry having desired shapes and may form as-designed ornaments and graphics.

PREFERRED EMBODIMENT

A silver powder of the silver clay is constituted of silver powder that is mainly composed of Ag, wherein the amount of P component is controlled to be 100 ppm or less. The above-described silver powder may contain P that is controlled to be in the amount of 100 ppm or less and the balance consisting of Ag and unavoidable impurities. Such an Ag powder may be obtained by atomizing molten silver using water containing 18 ppm or less of P. The above-described silver powder may contain a metal component that is alloyed with Ag. In this case, a molten silver alloy may be atomized using water containing 18 ppm or less of P.

The inventors conducted a research to solve the problems related to the occurrence of scabs at the time of firing the shaped body of silver clay.

Figure 1:
FIG. 1 is a photograph of a sintered body of silver clay.

The occurrence of scabs is not observed in the fired body shown in FIG. 1. Therefore, it is understood that the achieved ornament is in the normal state, that is, free from defective sintering. As a result of composition analysis of the surface of the fired body using an electron probe micro analyzer (EPMA), only Ag was detected and another component was not detected.

Figure 2:
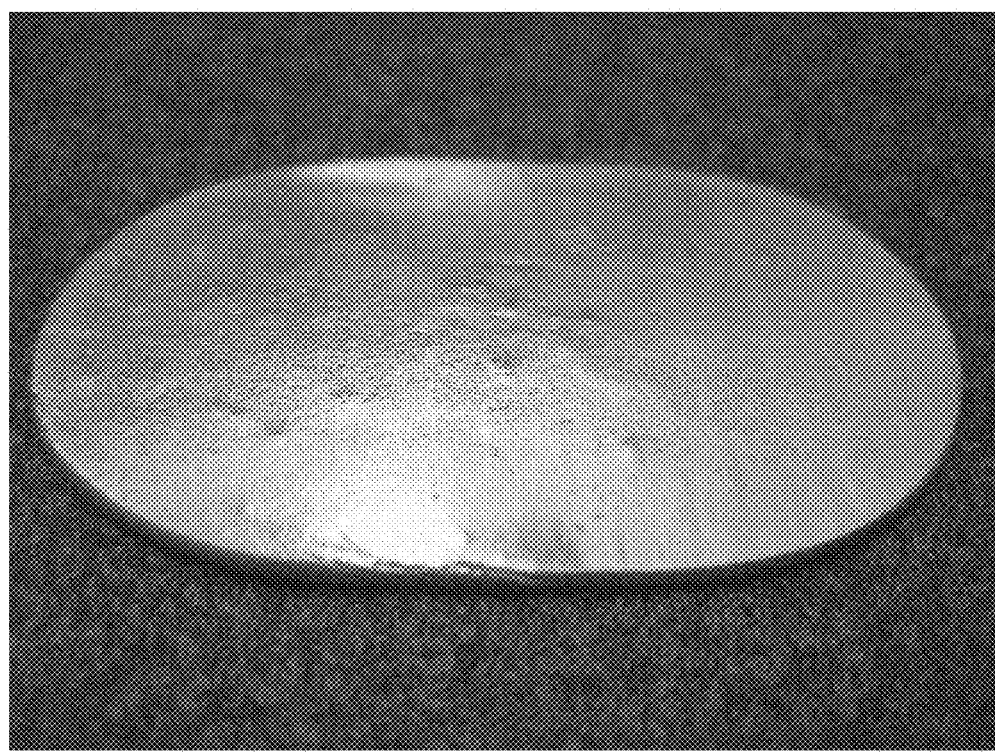
FIG. 2 is a photograph that shows an occurrence of scabs in a sintered body of silver clay.
Figure 3:
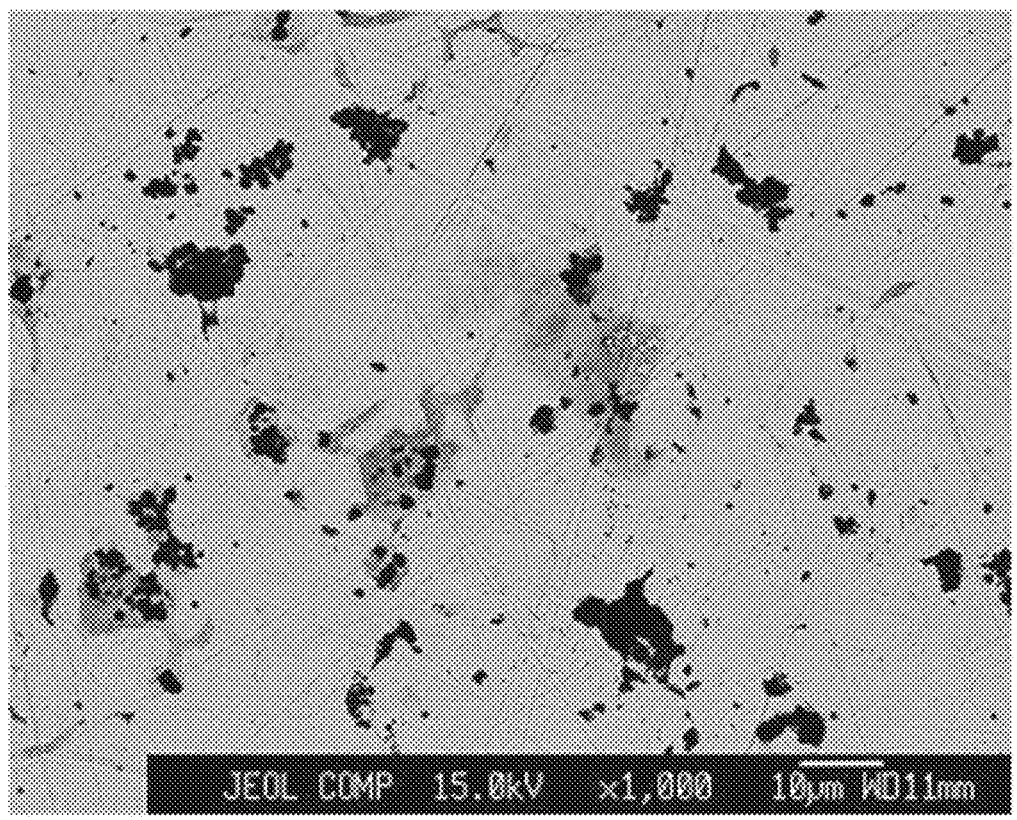
FIG. 3 is a photograph that shows a result of EPMA of a scab portion on the surface of a sintered body shown in FIG. 2.

On the other hand, as a result of EPMA analysis of the surface of the scab portion of the fired body as shown in FIG. 2, a small amount of P was detected as shown in FIG. 3. In FIG. 3, the bright portion is constituted of Ag, and the relatively dark gray portion includes P. On the other hand, as a result of EPMA analysis of the interior portion (cross section) beneath the scab portion of the fired body, a different component such as a P component was not detected in the interior of the fired body.

Based on the above-described results, it is obvious that the P component is not included in the normal state fired body of the silver clay. Based on the fact that the P component was detected in the surface of the scab portion in the fired body, it is understood that the generation of the scab was caused by the presence of the P component.

That is, it was found that the generation of the scab was caused by the P component included in the silver clay, and generation of the scab can be suppressed by reducing P component contained in the silver clay.

Specifically, as a result of analysis, the silver powder kneaded in the silver clay forming the fired body exhibiting the scab contained P in an amount exceeding 100 ppm. It is considered that the P exists in the form of P compounds (such as $Ag_3PO_4$) coating the Ag particles, and the P compounds precipitate as particles when the silver powder is mixed with the binder. It is considered that the P compounds are gasified during firing of the silver clay shaped body, causing generation of scabs that affect the sintering state of the shaped body.

As a result of various experiments, the scabs appeared remarkably on the surface of the silver clay fired body where the P in the silver powder exceeded 100 ppm by mass. Specifically, the occurrence of scabs was remarkable when the P compounds existed as large particles. Further, it was confirmed that the scab easily occurred as the thickness of the silver clay shaped body was thin.

Therefore, in order to prevent the generation of scabs, it is important to reduce the amount of P component contained in the silver clay to as low as possible. In general, a water atomizing method to atomize molten silver powder with water is used in the production of silver powder. Since the water used in this method may contain P, the amount of P in the water was controlled to as low as possible, specifically, 18 ppm or less. By atomizing the molten silver using this water, it was possible to produce silver powder while reducing the amount of P contained in the silver powder. Where the amount of P in the silver powder was 100 ppm or less, it was possible to suppress the generation of scabs on the surface of the silver clay fired body.

It is important to further reduce the amount of P component included in the silver powder in order to reduce the P component in the silver clay. On the other hand, silver powder may have P concentration of about 20 ppm even when the P concentration in the water used in the atomizing is controlled to be 1 ppm or less. In order to further reduce the P concentration, a specific process is required, resulting in increased production costs of producing silver powder and silver clay. Therefore, it is preferable to control the concentration of P in the silver powder to be 100 to 20 ppm. A more preferable P concentration is 70 to 20 ppm, more preferably, 50 to 20 ppm. Alternatively, based on the consideration of balance between concentration reduction and cost reduction, the P concentration may be controlled to be 70 to 50 ppm.

It is preferable to suppress P concentration in the molten silver by using a silver raw material (bare metal) of low P concentration. Preferably, P concentration in the molten silver is less than 5 ppm.

Any binder such as cellulosic binder, polyvinyl-based binder, acrylic binder, wax-based binder, resin-based binder, starch, gelatin, wheat flour or the like may be used as the binder included in the silver clay of the present invention. It is most preferable to use cellulose binder, specifically, water-soluble cellulose. These binders are added since the binder is rapidly gelated by heating and makes it easy to maintain the shape of the shaped body.

Where necessary, a surface active agent may be further added to the silver clay of the present invention. The species of the surface active agent added to the clay is not specifically limited. It is possible to use a general surface active agent.

Where necessary, fat (oil and fat) may be further added to the silver clay of the present invention. The fat added to the silver clay may be selected from organic acid (oleic acid, stearic acid, phthalic acid, palmitic acid, sebacic acid, acetyl citrate, hydroxybenzoic acid, or lauric acid), acid ester (organic acid ester having methyl group, ethyl group, propyl group, butyl group, octyl group, hexyl group, dimethyl group, diethyl group, isopropyl group, or isobutyl group), higher alcohol (ocyanol, nonanol, or decanol), polyol alcohol (glyceline, arabite, or sorbitan), ethel (dioctyl ethel or didecyl ether) or the like.

Where silver clay is formed by using the above-described materials, an amount of the silver powder is preferably 50 to 95 wt %, more preferably 70 to 95 wt %. An amount of binder is preferably 0.1 to 8 wt %, more preferably, 0.1 to 5 wt %. An amount of fat in the silver clay is preferably 0.1 to 1 wt %. An amount of fat in the silver clay is preferably 0.1 to 1 wt %, and an amount of surface active agent in the silver clay is preferably 0.1 to 3 wt %. In any of the above described cases, the balance may be water.

Example

As shown in Table 1, fired bodies of Examples 1 to 4 were prepared as an embodiment of the present invention. A fired body of Comparative Example 1 was prepared for the purpose of comparison.

TABLE 1

| | Composition of silver powder | | P in silver clay (ppm) | P in atomizing water | Scab | |
|---|---|---|---|---|---|---|
| | P (ppm) | Main component | | | Number | maximum size (mm) |
| Example 1 | 100 | Ag | 90 | 18 | 1-4 | 0.5 mm |
| Example 2 | 70 | Ag | 65 | 15 | 0-2 | 0.3 mm |
| Example 3 | 50 | Ag | 45 | 1 | 0 | — |
| Example 4 | 20 | Ag | 18 | less than 1 | 0 | — |
| Comparative 1 | 110 | Ag | 95 | 20 | 5 or more | 0.5 mm |

An atomized silver powder mainly composed of Ag was obtained by atomizing molten silver using water. The atomized silver powder was used as the silver powder used in the preparation of the fired bodies of Examples 1 to 4 and Comparative Example 1. P components detected as a result of the composition analysis using a spectrophotometer was 18 ppm or less in the atomizing waters used in Examples 1 to 4. Amounts of P components in the silver powders obtained by atomization using these atomizing waters were 20 to 100 ppm as a result of analysis using an ICP optical emission spectrometer.

On the other hand, as a result of analysis using a spectrophotometer, the atomizing water used in the preparation of the fired body of Comparative Example 1 contained 20 ppm of P. An amount of P component in the silver powder obtained by atomization using this atomizing water was 110 ppm. P concentration of the molten silver before atomization was less than 5 ppm in each of Examples 1 to 4 and Comparative Example 1.

Silver clays in Examples 1 to 4 and Comparative Example 1 were prepared by using the thus obtained silver powders. Silver powder of 90 wt % and binder of 10 wt % were used in the preparation process, where the binder was composed of water of 9 wt % and metolose (registered trademark: Shin-Etsu Chemical Co.) (methylcellulose) of 1 wt %. Thus prepared silver clays had the amounts of P component as shown in Table 1.

Next, a plurality of plate shaped bodies having a thickness of 1.5 mm and an area of 1 cm$^2$ were prepared using each of the silver clay, and a plurality of fired bodies were obtained by firing the shaped bodies at 900° C. for 10 minutes. In Comparative Example 1, 5 or more scabs having a maximum size of 0.5 mm occurred on the surfaces of the fired bodies, showing defective sintering. On the other hand, in each of the fired bodies of Examples 1 to 4, no scabs occurred on the surfaces of the fired bodies or, even when the scabs occurred, only a few scabs occurred, showing a satisfactory sintering state.

As explained above, where the silver clay according to the invention in which P component is suppressed to be 100 ppm or less is used, it is possible to suppress occurrence of scabs on the surface of the fired bodies after the firing and the fired body exhibits a satisfactory sintering state even when the fired body is shaped to have a thin plate shape. Therefore, it is possible to achieve an as-designed ornament and pattern and to form the silver artistic craft objects and silver jewelry easily into a desired shape.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A silver clay comprising a silver powder, a binder, and a balance of water, wherein
    a main component of the silver powder is Ag, and an amount of P is controlled to be 20 ppm or more and 70 ppm or less, and
    the silver is obtained by atomizing molten silver using water containing 15 ppm or less of P.

2. The silver clay according to claim 1, further comprising a surface active agent.

3. The silver clay according to claim 1, further comprising a fat.

4. The silver clay according to claim 1, further comprising a fat and a surface active agent.

5. The silver clay according to claim 1, wherein the amount of P in the silver clay is 18 ppm or more and 65 ppm or less.

* * * * *